United States Patent [19]
Stevens et al.

[11] Patent Number: 5,540,941
[45] Date of Patent: Jul. 30, 1996

[54] METHOD OF PROCESSING SOLID FOOD BY ELECTRIC HEATING

[75] Inventors: Alan Stevens, St. Neots, England; Catherine Moriarty, Bedford, Ireland

[73] Assignee: Unilever Patent Hodlings B.V., Vlaardingen, Netherlands

[21] Appl. No.: 438,305
[22] Filed: May 10, 1995

Related U.S. Application Data

[63] Continuation of Ser. No. 174,454, Dec. 28, 1993, abandoned.

[30] Foreign Application Priority Data

Dec. 29, 1992 [EP] European Pat. Off. .............. 92311833

[51] Int. Cl.$^6$ ............................... A23L 3/10; A23L 3/32
[52] U.S. Cl. .................... 426/234; 426/244; 426/412
[58] Field of Search .................................. 426/234, 244, 426/246, 412; 53/440, 441; 99/358, 451; 219/385, 386, 387, 521

[56] References Cited

U.S. PATENT DOCUMENTS 3,245,338  4/1966  Korr ........................................ 99/358
3,873,742  3/1975  Miyahara ................................. 426/234
3,886,290  5/1975  Theimer et al. ...................... 99/358 X
4,089,982  5/1978  Miyahara ........................... 426/234 X
4,161,908  7/1979  Miyahara ................................. 99/349
4,496,594  1/1985  Miyahara ............................ 99/358 X
4,983,411  1/1991  Tanaka et al. .......................... 426/234

OTHER PUBLICATIONS

Japanese Patent Abstracts 63–207372, 63–269971, 62–186776.

Primary Examiner—Arthur L. Corbin
Attorney, Agent, or Firm—Cushman Darby & Cushman, LLP

[57] ABSTRACT

Method of and apparatus for processing, sterilizing and packaging solid food in which a food portion is held in a saline solution contained in an enclosure formed by a packaging film, the food portion is processed and sterilized by ohmic heating, which also sterilizes the inside surface of the film, and after processing, the enclosure is collapsed around the food portion and resealed as an encapsulation around it, thus producing a sterilized package.

7 Claims, 2 Drawing Sheets

METHOD OF PROCESSING SOLID FOOD BY ELECTRIC HEATING

This is a continuation of application Ser. No. 8/174,454, filed on Dec. 28, 1993, now abandoned.

FIELD OF THE INVENTION

This invention relates to a method of and apparatus for processing, sterilising and packaging food.

BACKGROUND OF THE INVENTION

There exist many instances in the food industry where a solid food component, typically of meat, fish or vegetable, requires to be processed by heating and after cooling to be packaged. Sterilisation is an essential requirement in such procedures and is commonly effected during processing. Generally, however, the processed food component then requires both to be transferred to packaging equipment and packaged without compromising the previously achieved sterility.

It is known to at least partly overcome this problem by processing the food within its packaging. In general however, this has only been accomplished by application of heat from outside the packaging, e.g. by use of microwaves. Food processing in this way is not wholly satisfactory. AS the heat is applied from the outside inwards, the temperature rise at the outer regions of the food component is higher than that at the inner region, and unless the outer regions are substantially overprocessed, which is highly undesirable, the inner regions are not adequately processed and may not be properly sterilised, which is equally undesirable.

Especially for liquid foods, ohmic heating is a known process for effecting sterilisation. This involves passing an electric current directly through the food. With ohmic heating it is possible to carry out processing in a manner which achieves more uniform temperatures throughout the food. Prima facie, however, ohmic heating is not applicable to a food already enclosed within its packaging.

From U.S. Pat. Nos. 3,873,742 and 4,161,908, it is known to process a salt-impregnated food of kneadable nature, such as minced meat, by ohmic heating. The methods disclosed involve the filling of a tube of wrapping material which is sealed at its ends by conductive end members in contact with the food material with which the tube is packed. Current is then passed between the end members to heat the food by the Joule effect.

The methods known from these patents are not applicable to solid food components which possess a definite shape. Moreover, a disadvantage of the disclosed methods is that the end members form part of the finished food wrapping.

Having regard to all the foregoing, it is an object of the present invention to provide an improved system for processing, sterilising and packaging a solid food, especially a solid food component having a definite shape.
The invention
According to one aspect of the invention, there is provided a method of processing, sterilising and packaging foods, according to which a solid food component is located within a sealable packaging film defining a sealed enclosure, the enclosure is filled with an electrically conductive liquid, an electric current is passed through the contents of the enclosure in order to effect ohmic heating of the food component, after processing the food component the enclosure is exhausted of liquid and of air, the packaging material is allowed to collapse and is resealed to encapsulate the food component, and the encapsulated food component is separated from the remainder of the packaging film which defined the original enclosure.

The electrically conductive liquid employed is preferably one which has sterilising properties, such as a saline solution.

This method has the advantages of processing by a method which can be controlled to achieve substantially uniform temperatures throughout the solid food component, of avoiding any step of transfer to a packaging station after processing, and of sterilising the internal surface of the packaging film, which constitutes the sole sealed wrapping of the finished food, at the same time as food processing.

Our International Published Application WO/94/08475 describes a method of and apparatus for processing a solid food component by ohmic heating in a manner which achieves remarkably uniform temperatures throughout the food. In this method, the food is located in saline liquid in an enclosure in which the pressure is controlled, in relation to the saturated vapour pressure of the food, throughout ohmic heating. This method is applicable to the present invention, more particularly in that, during processing, pressure within the enclosure is controlled by restricting the expansion of the liquid.

Preferably, the packaging film is used to define an enclosure of known volume and the amount of liquid required to fill the volume is monitored to determine the volume of the food component in order to provide control data for processing by ohmic heating. Thus, the control data provides the information necessary to determine the magnitudes of the electric current and the applied pressure during ohmic heating of a particular food component.

Usually, after processing by ohmic heating and exhaustion of the liquid, the enclosure is at least partly evacuated and the food component allowed to cool prior to encapsulation. In a preferred method, on completion of processing by ohmic heating, the liquid is flushed from the enclosure by pressurised sterile air, and then evacuated to initiate the cooling process.

In a preferred method, the enclosure around the food component is defined by at least one film former and a pair of anvils to which the packaging film is sealed to define the ends of the enclosure. The anvils can carry electrodes and at least one of the anvils carries liquid and air service pipes for supply of liquid and air to and exhaustion of liquid and air from the enclosure. Conveniently, after removal of the film former or formers, the anvils may be movable towards one another to allow the packaging film to collapse when the food component is to be encapsulated.

Thus, in a preferred method, after completion of cooling in the evacuated condition, the enclosure is allowed to return to atmospheric pressure with sterile air. The film former or formers are then removed, and the air again evacuated from the enclosure at the same time as the anvils are moved towards one another. The packaging film thus collapses around the food component and can be sealed to encapsulate the food as collapse of the film takes place. As the film forming the encapsulation is a part of the film forming the original enclosure, its inner surface has been sterilised with the food during the ohmic heating process, and no additional step of sterilising the packaging is necessary.

The encapsulation can be severed from the remainder of the film forming the original enclosure as a dual action of the film sealing step which completes the food encapsulation. It then remains only to remove the encapsulated food component and prepare for processing, sterilisation and packaging of the next food component.

According to another aspect of the invention, there is provided apparatus for processing, sterilising and packaging food, comprising means defining a sealed enclosure of sealable packaging film around a solid food component, means for filling and exhausting the enclosure with an electrically conductive and sterilising liquid, means for filling and exhausting the enclosure with sterile air, electrodes for passing a current through the enclosure to effect processing of the food component by ohmic heating, means operative after processing and exhaustion of liquid and air for allowing the packaging film to collapse around the food component, and means for resealing the film as an encapsulation around the food component and for separating the encapsulated food component from the remainder of the packaging film which defined the original enclosure.

The means defining the enclosure, in addition to the packaging film, preferably comprises at least one film former and a pair of anvils which form opposite ends of the enclosure. The anvils may conveniently carry the electrodes and the means for filling and exhausting the enclosure with liquid and air.

Preferably, after exhaustion of liquid and air from the enclosure and removal of the film former or formers, the anvils are movable towards one another to enable the packaging film to collapse around the food component.

According to a preferred method, the enclosure is defined with known volume and means are provided for monitoring the amount of liquid required to fill the container in order to provide control data for processing by ohmic heating. Moreover, in accordance with the method and apparatus described in our aforementioned Europen patent application, means are provided for controlling the pressure within the enclosure during processing by ohmic heating.

DESCRIPTION OF EMBODIMENT

Figure 1:
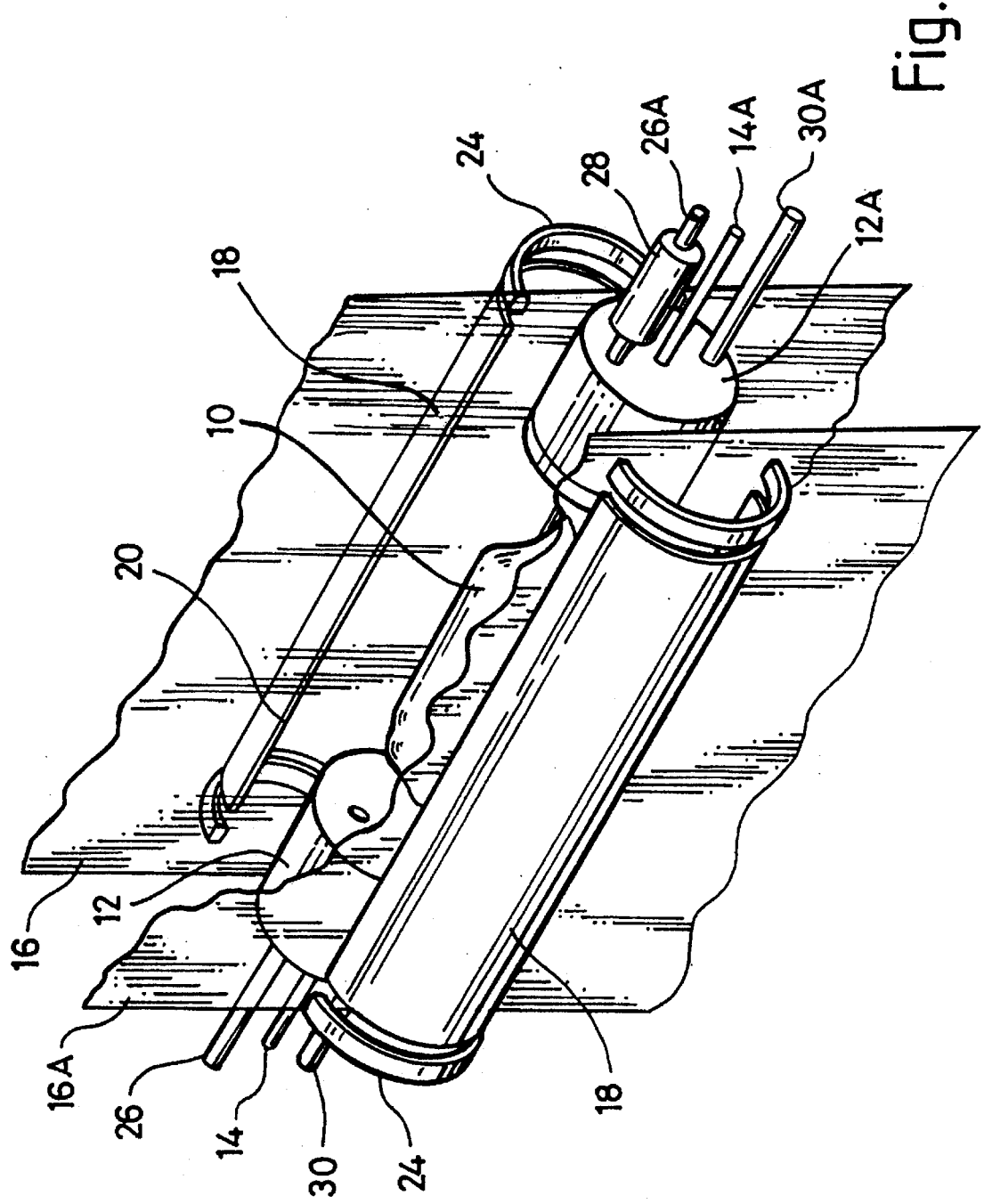
Figure 2:
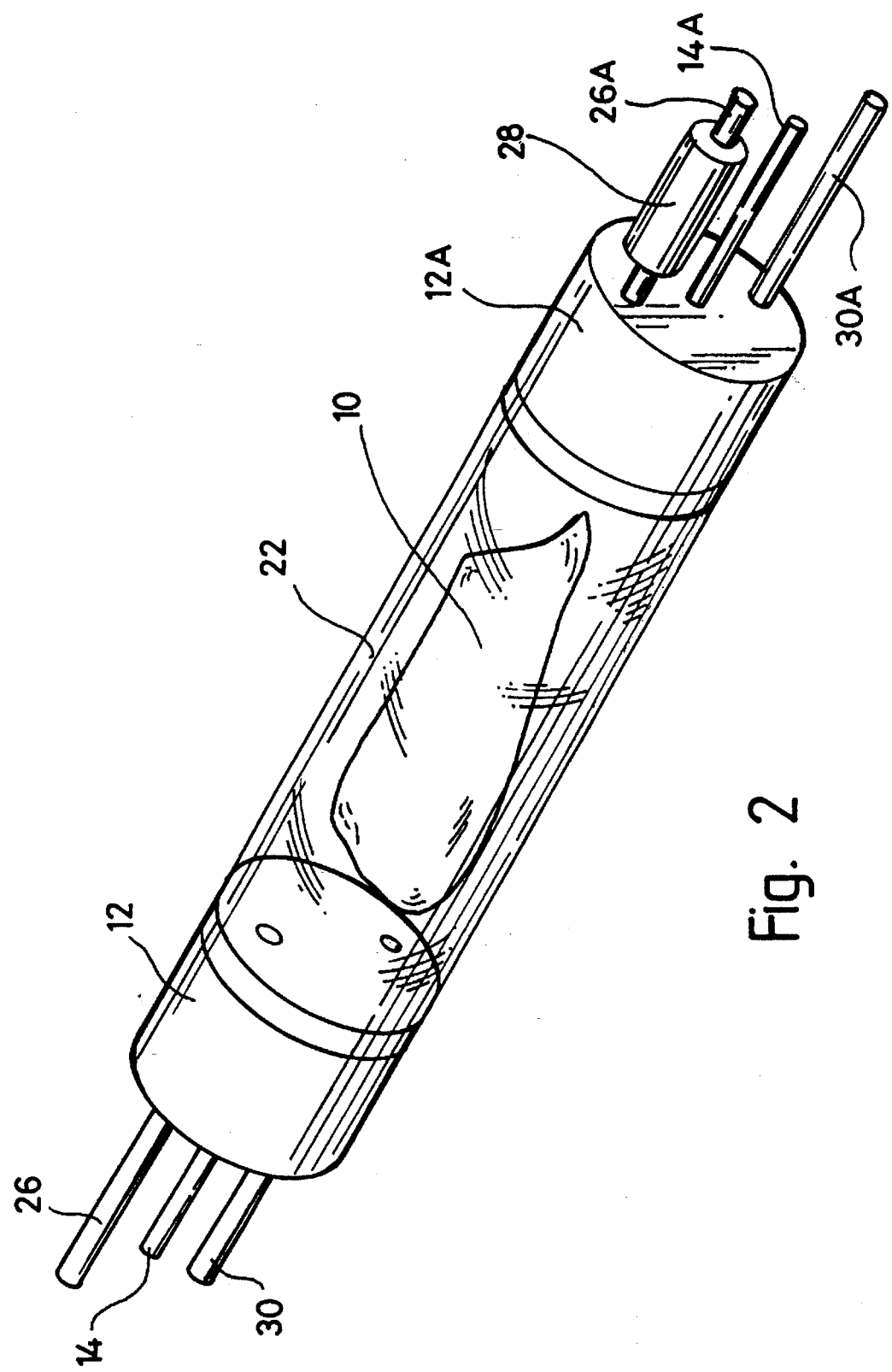

The method and apparatus in accordance with the invention are now described by way of example with reference to the accompanying drawings, in which:

FIG. 1 shows in diagrammatic manner apparatus for carrying out the method of the invention, at the stage of production of an enclosure of packaging film; and FIG. 2 shows the apparatus after production of an enclosure, the film formers being omitted.

The apparatus will be clear from the following description of its method of use.

First, a food component 10 such as a chicken portion is placed between two anvils 12, 12A which carry electrodes 14, 14A.

Two sheets of heat-sealable packaging film 16, 16A are then drawn around the anvils 12, 12A, and two film formers 18 incorporating heat sealing jaws 20 are brought together to form a cylinder 22 (see FIG. 2) of packaging film, the cylinder having opposite end caps formed by the anvils 12, 12A.

A suitable packaging material is required to withstand a temperature corresponding at least to the temperature required for sterilisation, for example up to 140° C., and possibly 150° C., without degradation, and a maximum pressure of 2 bar. The material must also have appropriate microbiological barrier properties. A number of specific packaging materials have the required properties, but one example is a polyester/modified polypropylene combination.

The heat sealing jaws 20 are used to seal the films 16,16A together along the top and bottom of the cylinder parallel to the cylinder axis, and film clamps 24 are locked onto and around the anvils 12,12A to complete the production of a sealed enclosure containing the food portion 10.

A saline solution is then introduced into the enclosure through service pipes 26, 26A in the anvils.

The enclosure being of known dimensions determined by the dimensions and spacing of the anvils 12, 12A, monitoring of the amount of saline solution required to fill the enclosure by flowmeter 28 determines the size of the food portion, thus providing data which serves as information for controlling the processing of the food portion 10.

This processing is carried out by ohmic heating, effected by applying an electric potential across the electrodes 14, 14A, thereby causing a current to pass through the saline solution and the food portion 10 immersed in it.

Pressure in the enclosure during ohmic heating is controlled by restricting expansion of the saline solution as its temperature rises. In accordance with the invention of our above-mentioned published International patent application, the pressure is so controlled in relation to the saturated vapour pressure of the food portion 10 that this food portion is substantially uniformly raised in temperature throughout its mass.

When the desired sterilising temperature has been attained, typically a temperature in the range 110° C. to 150° C. but dependent on the product being handled, it is sustained and maintained constant for a limited period by controlled pressure relief. Feedback control may be employed to maintain power input to the system at a level appropriate to maintenance of the sterilising temperature during the holding period.

It will be appreciated that, during processing, all surfaces in contact with the saline solution become sterilised, including the inside surface of the cylinder of packaging film.

On completion of the step of ohmic heating with pressure control, the saline solution is flushed out of the enclosure by pressurised sterile air, supplied through service pipes 30, 30A in the anvils 12, 12A. The enclosure is then evacuated of air to allow cooling of the food portion 10 to take place. On completion of the cooling step, the enclosure is allowed to return to atmospheric pressure, again with sterile air, before the film formers 18 are separated to leave a cylinder of film attached to the anvils 12, 12A. This is the condition shown in FIG. 2.

Air is now again evacuated from the enclosure, and at the same time, by means not shown, the anvils 12, 12A are moved closer together. This causes the cylinder of packaging film to collapse around the food portion 10, so that a pair of sealing jaws (not shown) may be used to seal the film around the food portion 10 to encapsulate it, as collapse of the film is completed to allow opposite sides of its inside surface to meet. The processed and sterile food component 10 is now encapsulated in a film package of which the inside surface has also been fully sterilised.

The encapsulated food portion may be severed from the original film web as a dual action of the not shown sealing jaws.

Having removed the packaged product, the film clamps 24 may also be removed to allow fresh packaging film to be drawn over the anvils 12, 12A in readiness for the commencement of processing, sterilisation and packaging of the next food portion.

It will be appreciated that, in practice, the above-described apparatus may form one part of a multi-part machine capable of processing a multiplicity of food portions simultaneously. Moreover, processing in this way would be possible with both horizontal process and vertical process packaging machines.

In the above-described method, the food portion 10 is supported by the film formers 18 during processing. This may tend to give rise to thermal gradients in the food portion adjacent the support positions. However, these thermal gradients may be minimised if not eliminated by rotating the cylindrical enclosure about its axis in an oscillatory manner, thereby to ensure contact of the saline solution with the whole surface of the food portion for almost the entire duration of the heating step. In fact, it is a general requirement to avoid or minimise heat exchange across boundaries and this requirement may be met in a number of ways. One possibility is to employ an external heated jacket.

It is also apparent that a packaging film will be employed which is capable of withstanding the maximum processing temperature without delaminating or giving rise to ion migratory problems.

We claim:

1. A method of processing, sterilising and packaging a solid food component which comprises, locating the solid food component between and in spaced relationship to two spaced electrodes which are carried by a pair of opposed anvils, locating a portion of a sheet of sealable packaging film around the food component and holding the film in place by film clamping means to form an initial sealed enclosed containing the food component and defined at least in part by the electrodes and the film, wherein at least one of the anvils carries liquid and gas service pipes for the supply of liquid and gas to and the exhaustion of liquid and gas from the enclosure, filling the initial sealed enclosure with an electrically conductive liquid, passing an electric current through the contents of the thus enclosure too effect ohmic heating of the food component so as to sterilize and process the same, thereafter exhausting liquid from the enclosure, sealing the film to it self to form a final sealed enclosure comprising the food component encapsulated within the film, and releasing the film clamping means.

2. A method of processing, sterilizing and packaging a solid food component which comprises, locating the solid food component between and a spaced relationship to two spaced electrodes which are carried by a pair of opposed anvils, locating a portion of a sheet of sealable packaging film around the food component and holding the film in placed by film clamping means to form in initial sealed enclosure containing the food component and defined at least in part by the electrodes and the film, filling the initial sealed enclosure with an electrically conductive liquid, passing an electric current through the contents of the thus filled enclosure to effect ohmic heating of the food component so as to sterilize and process the same, thereafter exhausting liquid from the enclosure, moving the anvils relatively toward one another to allow the packaging film to collapse, sealing the film to itself to form a final sealed enclosure comprising the food component encapsulated within the film, and releasing the film clamping means.

3. A method according to claim 2 wherein pressure within the enclosure is controlled by restricting the expansion of the liquid.

4. A method according to claim 2 wherein the packaging film is used to define an enclosure of known volume and the amount of electrically conductive liquid required to fill the enclosure is monitored to provide control data for processing by ohmic heating.

5. A method according to claim 2 wherein after said ohmic heating and exhaustion of the liquid, the enclosure is at least partly evacuated of air and the food component is allowed to cool prior to being encapsulated.

6. A method according to claim 2, wherein the encapsulated food component is separated from the remainder of the sheet of packaging film after forming the final sealed enclosure.

7. A method according to claim 6, wherein the method is repeated with a further solid food component and another portion of the sheet of sealable packaging film being drawn into position around said further solid food component.

* * * * *